(12) United States Patent
Endou et al.

(10) Patent No.: US 7,207,317 B2
(45) Date of Patent: Apr. 24, 2007

(54) ENGINE CONTROL SYSTEM

(75) Inventors: Tsuneaki Endou, Numazu (JP); Jun Kawagoe, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/285,242

(22) Filed: Nov. 22, 2005

(65) Prior Publication Data

US 2006/0107926 A1    May 25, 2006

(30) Foreign Application Priority Data

Nov. 22, 2004   (JP)   ............................. 2004-337521

(51) Int. Cl.
*F02D 43/00* (2006.01)
*F02P 5/152* (2006.01)

(52) U.S. Cl. ............................ 123/435; 123/198 DC; 123/406.45

(58) Field of Classification Search ........... 123/406.29, 123/406.37, 406.45, 406.47, 435, 198 DC; 73/35.03–35.05
See application file for complete search history.

(56) References Cited

U.S. PATENT DOCUMENTS

| | | | |
|---|---|---|---|
| 4,535,739 A | * | 8/1985 | Kudo et al. ................. 123/435 |
| 4,667,637 A | * | 5/1987 | Staerzl ....................... 123/435 |
| 5,673,667 A | * | 10/1997 | Nakamura ............. 123/406.47 |
| 2005/0235956 A1 | | 10/2005 | Watanabe et al. ...... 123/406.26 |

FOREIGN PATENT DOCUMENTS

| | | |
|---|---|---|
| JP | 06-108955 | 4/1994 |
| JP | 2002-357174 | 12/2002 |

* cited by examiner

*Primary Examiner*—T. M. Argenbright
(74) *Attorney, Agent, or Firm*—Pearne & Gordon LLP

(57) ABSTRACT

An engine control system for controlling an engine into which fuel is supplied from a fuel supply system and which is ignited by an ignition system, the engine control system comprising: a detonation detecting device for detecting detonation of said engine; a judgment level setting device for setting a judgment level for judging whether detonation, which requires to be controlled, occurs; an enrich controlling device for controlling the fuel supply system so as to vary, to a rich-side, air-fuel ratio of air-fuel mixture being supplied to the engine for controlling the detonation when a level of an output signal of the detonation detecting device is equal to or more that the judgment level; and an ignition controlling device for controlling the ignition system so as to intermittently stop an ignition operation of the engine when the detonation can not be controlled by the enrich controlling device.

5 Claims, 5 Drawing Sheets

ENGINE CONTROL SYSTEM

TECHNICAL FIELD OF THE INVENTION

The present invention relates to an engine control system which performs a control for controlling detonation of an engine.

BACKGROUND OF THE INVENTION

In a gasoline engine, an air-fuel mixture is ignited, when a spark is generated in an ignition plug at an ignition timing, and combustion progresses, which is caused by propagation of a flame in a combustion chamber, to perform an expansion stroke. However, when the temperature inside of the combustion chamber partially becomes high in the expansion stroke, a spontaneous combustion phenomenon of fuel occurs before the combustion caused by propagation of the flame is performed. The phenomenon is called detonation (abnormal combustion), which abnormally and partially increases a temperature in the combustion chamber.

Especially, in a two-cycle engine in which one combustion cycle is performed during one rotation of a crankshaft, heat load of a piston or a cylinder is large, and thus temperature of an earth electrode part at the tip of an ignition plug or the like tends to partially become high, which causes detonation to occur easily. If a situation where detonation is occurring is allowed to stand, a part of metal constructing a cylinder is melt since a temperature of a part of a piston or the cylinder abnormally increases, which may lead the piston to be seized. Thus, if detonation occurs in the engine, it is necessary to detect the detonation promptly and take a step for inhibiting the occurrence of the detonation.

As shown in Japanese Patent Laid-Open Publication No. 6-108955 or Japanese Patent Laid-Open Publication No. 2002-357174, various control methods and control systems for inhibiting detonation occurred in two-cycle engines are proposed. In a conventional engine control system for inhibiting detonation, a sensor which detects occurrence of detonation is provided to perform one or both of an enrich control for enriching an air-fuel ratio of mixture and an ignition timing delay control for delaying an ignition timing of an engine, when the occurrence of detonation is detected by the sensor.

If the enrich control for enriching the air-fuel ratio of mixture or/and the ignition timing delay control for delaying the ignition timing of the engine is/are performed when detonation occurs in the engine, a temperature in a combustion chamber can be lowered, and thus detonation can be controlled.

In this type of the conventional control system, since the occurrence of detonation is controlled for the purpose of inhibiting a seizure of a piston, the occurrence of detonation to some extent is allowed. The reason the slight occurrence of detonation is allowed is that the seizure of the piston does not occur with the slight detonation and that shaft horse power of an engine is increased since combustion efficiency is improved in a state where the detonation occurs to some extent.

As described above, in the conventional engine control system which performs control of detonation, the occurrence of the detonation to some extent is allowed in order to try to improve an output of the engine. However, slight detonation may occur in a situation where an engine temperature is considerably high even if a driver closes a throttle valve to lower the output of the engine. If such a situation occurs, since the output of the engine is maintained at a high level even in a state where the throttle valve is closed, an adjustment for lowering the engine output to an output level desired by the driver cannot be performed by operating the throttle. If such a condition which is against the driver's intention suddenly occurs, under certain circumstances, there is a possibility that the driver cannot control the vehicle, which is undesirable.

In addition, if the detonation occurs in a condition where the throttle valve is closed, abnormal combustion sound (rattle sound) occurs, which may give discomfort to the driver and surrounding people.

SUMMARY OF THE INVENTION

An object of the present invention is to provide an engine control system which is able to inhibit occurrence of the situation that high shaft horse power of an engine is maintained even if a throttle valve is closed when an engine temperature rises, that abnormal sound occurs from the engine in a condition where the throttle is closed, or the like.

The present invention is applied to an engine control system for controlling an engine into which fuel is supplied from a fuel supply system and which is ignited by an ignition system.

In the present invention, there are provided: a throttle sensor which detects an opening degree of a throttle valve of the engine; detonation detection means which outputs a detonation detection signal which level varies according to strength of detonation when the detonation occurs in the engine; judgment level setting means which gives a judgment level being compared to the level of the detonation detection signal in order to judge whether the detonation which is necessary to be inhibited in the engine occurs; enrich control means which controls the fuel supply system so that an air-fuel ratio of mixture being supplied to the engine is changed to a rich-side in order to control the detonation when the level of the detonation detection signal is equal to or more than the judgment level; and detonation control ignition control means which controls the ignition system so as to intermittently stop an ignition operation of the engine for controlling the detonation when the detonation detection signal is equal to or more than the judgment level even, if the air-fuel ratio is enriched to the limit by the enrich control means.

In the present invention, the aforementioned judgment level setting means is comprised so that the judgment level is set as a first value when the opening degree of the throttle valve detected by the throttle sensor is less than a set opening degree and that the judgment level is set as a second value which is larger than the first value when the opening degree of the throttle value detected by the throttle sensor is equal to or more than the set opening degree.

As aforementioned, when the opening degree of the throttle valve becomes less than the set value, if the judgment level compared to the level of the detonation detection signal is switched to a smaller value in order to judge whether the detonation which is necessary to be inhibited occurs, slight detonation is detected as the detonation necessary to be inhibited when the throttle valve is closed. Then, a control for inhibiting the detonation, that is, enrichment of an air-fuel ratio of mixture and/or a delay of an ignition timing or intermittent stop (thinning of ignition spark) of an ignition operation, is/are performed to control the detonation.

Thus, when the engine temperature increases, and when it is occurred a situation in which the detonation occurs even if the throttle valve is closed, it is possible to immediately inhibit the detonation and prevent occurrence of an abnormal situation such that a high engine output is maintained even if the throttle valve is closed and that abnormal sound from the engine is caused when the throttle valve is closed.

In a preferable aspect of the invention, the aforementioned fuel supply system is constituted by a fuel injection system comprising an injector which injects a fuel to be supplied to an engine while the injector is driven and a fuel pump which supplies the fuel to the injector. In this case, the enrich control means is constituted so as to vary the air-fuel ratio toward the rich-side by extending a driving time of the injector over a normal driving time of the same.

As described above, when the fuel supply system is constituted by a fuel injection system comprising an injector which injects a fuel to be supplied to an engine while the injector is driven and a fuel pump which supplies the fuel to the injector, the enrich control means may be constituted so as to vary the air-fuel ratio toward the rich-side by increasing a pressure of fuel to be supplied to the injector from the fuel pump.

In another preferable aspect of the present invention, the fuel supply system comprises: a main injector and an auxiliary injector which inject a fuel to be supplied to an engine while the injectors are driven; and a fuel pump which supplies the fuel to both injectors, and the fuel supplied system is constituted so as to supply the fuel to the engine by driving the main injector at a normal state. In this case, enrich control means is constituted so as to vary an air-fuel ratio to a rich-side by injecting the fuel from both of the main injector and the auxiliary injector.

In further another aspect of the invention, the fuel supply system is constituted by a carburetor comprising an enrich mechanism which increases a fuel supply amount. In this case, the enrich control means is constituted so as to vary an air-fuel ratio to a rich-side by controlling the enrich mechanism of the carburetor.

Thus, according to the present invention, since the judgment level being compared to the level of the detonation detection signal is switched to the smaller value in order to judge whether the detonation necessary to be inhibited occurs when the opening degree of the throttle valve becomes less than the set value, the slight detonation is detected as the detonation necessary to be inhibited when the throttle valve is closed. Then, the control for inhibiting the detonation, that is, enrichment of the air-fuel ratio of mixture and/or the delay of the ignition timing or intermittent stop (thinning of ignition spark) of the ignition operation, is/are performed to control the detonation.

In consequence, according to the invention, when the engine temperature increases, and when it is occurred the situation in which the detonation occurs even if the throttle valve is closed, it is possible to inhibit, by immediately inhibiting the detonation, occurrence of the abnormal situation such that the high engine output is maintained even if the throttle valve is closed and that abnormal sound from the engine is caused when the throttle valve is closed.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF THE PREFERRED EMBODIMENTS

Figure 1:
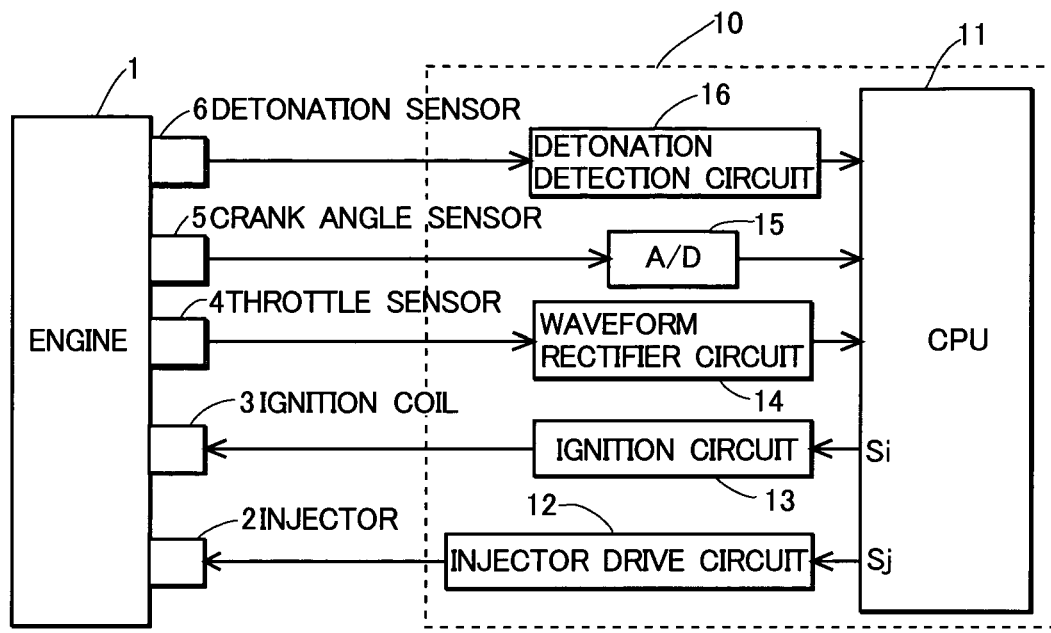
FIG. 1 is a block diagram of a construction of hardware according to a first embodiment of the present invention.

Now, preferred embodiments of the present invention will be described with reference to the drawings. FIG. 1 shows a construction of hardware according to a first embodiment of the present invention. In FIG. 1, a reference numeral 1 denotes a two-cycle engine to which an injector 2, an ignition coil 3, a throttle sensor 4 for detecting an opening degree of a throttle valve, a crank angle sensor 5 and a detonation sensor 6 are mounted.

The injector 2 is mounted so as to inject a fuel into an intake pipe or a combustion chamber of the engine 1 and opens its valve when the injector is driven to inject the fuel to be supplied to the internal combustion engine. The fuel is supplied to the injector from a fuel pump not shown. Since a pressure of the fuel to be supplied to the injector is maintained constant by a pressure regulator, a fuel amount injected from the injector is controlled using a time for driving the injector. The time for driving the injector is determined by an invalid injection time (a time between a start of driving the injector and a start of the injection of the fuel) and a time during which a valve of the injector is opened to actually inject the fuel.

The ignition coil 3, which constitutes an ignition system together with an ignition circuit described later, is comprised of a primary coil and a secondary coil which is connected to an ignition plug mounted on a cylinder head of the engine.

The throttle sensor 4 is comprised, for example, by a potentiometer mounted on a driving shaft of the throttle valve of the engine and generates voltage signals proportional to the opening degree of the throttle valve.

The crank angle sensor 5 is comprised of a rotor mounted on a crankshaft of the engine and a signal armature mounted on a engine case or the like, detects each of front and rear edges in a rotational direction of a reluctor which is constituted by a protrusion or a recess on a rotor, and generates first and second pulse signals having different polarities when the sensor detects the front edge and rear edge of each reluctor. The first or second pulse signal generated by the crank angle sensor is used as a reference crank angle position for starting a measurement of an ignition timing of the internal combustion engine and a reference crank angle position for starting a measurement of the driving time of the injector.

The detonation sensor 6 is comprised of a knocking sensor which is mounted on a cylinder of the engine and generates an electrical signals including a vibration information transmitted from the combustion chamber to the cylinder or a seated-type combustion pressure sensor (a GPS sensor) which is inserted between a mounting base of the ignition plug and a peripheral portion of a mounting hole of the ignition plug for generating electrical signals including an information of a combustion pressure of the engine. When detonation occurs, since signal components in a certain frequency band which is included in an output of the detonation sensor increase, it is possible to obtain detonation detection signals proportional to the strength of the occurred detonation by performing signal processing on the output of the detonation to take out the signal components in the certain frequency band.

In FIG. 1, a reference numeral 10 denotes an electronic control system (an ECU) which comprises a microcomputer 11, an injector drive circuit 12, an ignition circuit 13, a waveform rectifier circuit 14, an A/D conversion circuit 15 and a detonation detection circuit 16.

The injector drive circuit 12 is a circuit which supplies a driving voltage to the injector 2 when an injection command Sj is given from the microcomputer 11. The injection drive circuit 12 is comprised of a switch circuit for supplying a driving voltage. The switch circuit becomes on-state while the injection command signal Sj is given and supplies the driving voltage from a power source circuit which is not shown to the injector 2. The injection command signal Sj is a rectangular wave like signal having signal width corresponding to sum of invalid injection time and actual injection time.

The ignition circuit 13 is a circuit which controls a primary current of the ignition coil so as to cause the primary current of the ignition coil 3 to be abruptly changed when an ignition command signal Si is supplied from the microcomputer 11, and causes a high voltage for ignition to be induced in a secondary coil of the ignition coil. For this circuit, a well-known circuit such as a capacitor discharge-type circuit and a current breaking-type circuit can be used.

The waveform rectifier circuit 14 converts pulse signals output from the crank angle sensor 5 to signals capable of being recognized by the microcomputer and inputs the signals to a predetermined port of the microcomputer.

The A/D conversion circuit 15 converts a throttle opening degree detection signal output by the throttle sensor 4 into a digital signal and inputs the signal to a predetermined port of the microcomputer.

The detonation detection circuit 16 is comprised of a band-pass filter. The filter allows to pass only signal component in a frequency band which increases when the detonation occurs, using an output of the detonation sensor 6 as an input, and outputs a detonation detection signal Vd which is input into a predetermined port of the microcomputer 11.

The microcomputer 11 constitutes various means necessary for driving the engine, by executing a program stored in a ROM. In this embodiment, an overall construction of an engine control system including means constituted by the microcomputer is shown in FIG. 3.

Figure 3:
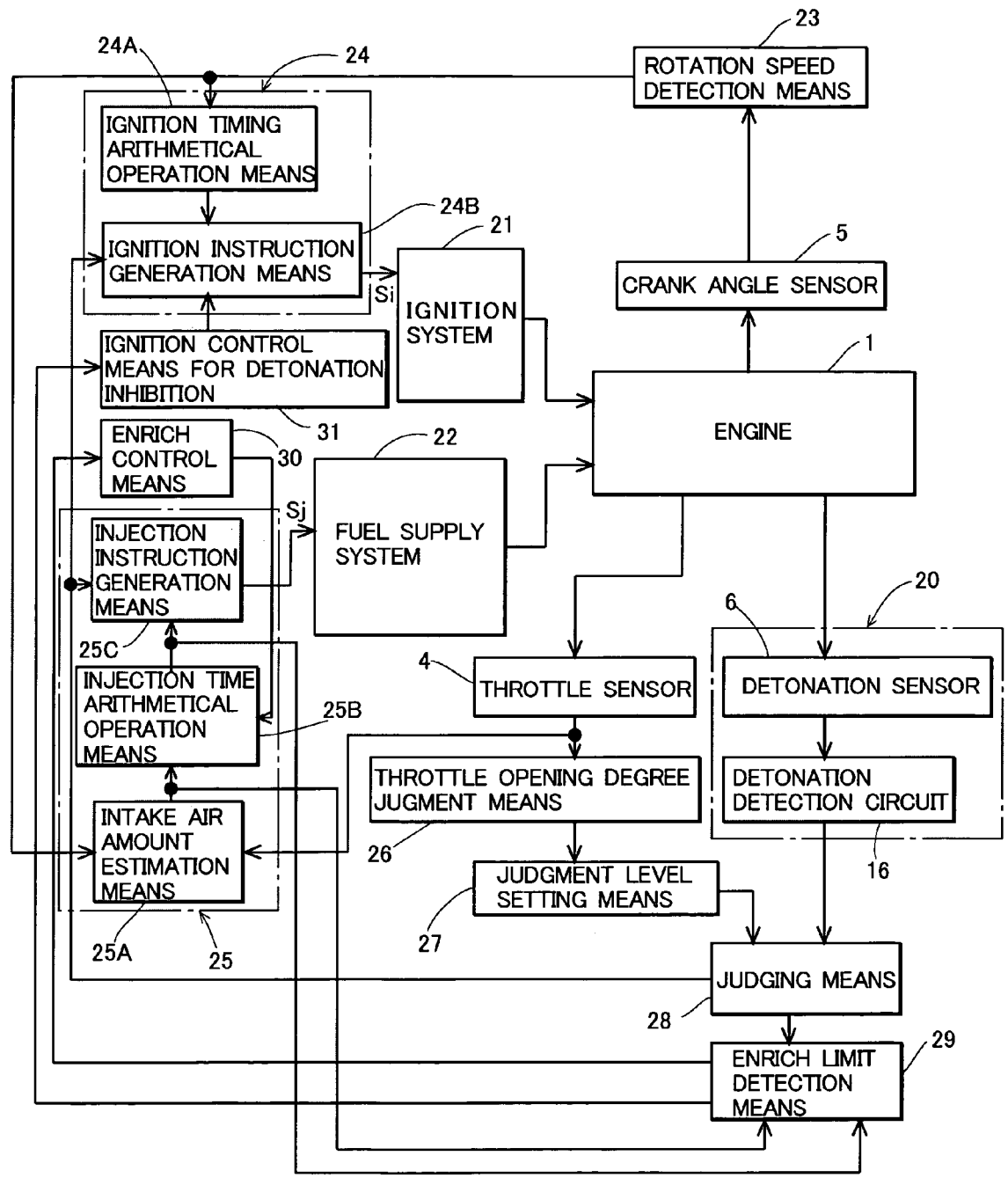
FIG. 3 is a block diagram of an overall construction including means constituted by a microcomputer according to the first and second embodiments of the present invention.

In FIG. 3, a reference numeral 20 denotes detonation detection means which is constructed by the detonation sensor 6 and the detonation detection circuit 16, which outputs a detonation detection signal comprised of a voltage signal which level corresponds to the strength of detonation. A reference numeral 22 denotes a fuel supply system which comprises the injector 2, a fuel pump for supplying a fuel to the injector and the injector drive circuit 12 for driving the injector. A reference numeral 23 denotes rotational speed detection circuit for detecting a rotational speed of the engine, 24 is normal state ignition control means for controlling an ignition system 21 so that the engine ignites at an optimum ignition timing relative to the rotational speed detected by the rotational speed detection means 23, at a normal operating state of the engine in which detonation necessary to be inhibited does not occur. The ignition control means is constituted by ignition timing arithmetical operation means 24A and ignition instruction generation means 24B.

Also, in FIG. 3, a reference numeral 25 denotes normal state fuel injection control means for controlling the fuel supply system 22 so as to maintain an air-fuel ratio of air-fuel mixture at an optimum value relative to various control conditions at the normal operating state of the engine in which the detonation necessary to be inhibited does not occur. The normal state fuel injection control means is constituted by intake air amount estimation means 25A, injection time arithmetical operation means 25B and injection instruction generation means 25C.

Further, in FIG. 3, a reference numeral 26 denotes throttle opening degree judgment means for judging whether the opening degree of the throttle valve detected by the throttle sensor 4 is less than a set opening degree, 27 denotes judgment level setting means for setting, according to a judgment result by the throttle opening degree judgment means 26, a judgment level which is compared with the detonation detection signal in order to judge whether the detonation necessary to be inhibited in the engine occurs, and 28 denotes judging means for comparing the detonation detection signal with the judgment level set by the judgment level setting means.

Also, a reference numeral 29 denotes enrich limit detection means for judging whether a current air-fuel ratio of air-fuel mixture is on the limit of the rich-side when it is judged by the judging means 28 that the level of the detonation detection signal exceeds the judgment level and a detonation occurs. A reference signal 30 denotes enrich control means for controlling the fuel supply system so that the air-fuel ratio is shifted to the rich-side by extending the fuel injection time when it is judged by the enrich limit detection means that the air-fuel ratio is not on the limit of the rich-side. A reference numeral 31 denotes ignition control means for detonation inhibition. The control means 31 controls the ignition system so that the ignition operation of the engine is intermittently stopped in order to inhibit the detonation when the detonation detection signal is equal to or more than the judgment level even if the air-fuel ratio is enriched to the limit by the enrich control means 30.

More specifically, the microcomputer 11 constitutes rotational speed detection means 23 by performing a process for arithmetically operating a rotational speed of the engine using a time interval of pulse signals generated from the crank angle sensor 5. The time interval of the pulse signals corresponds to a time required for a crankshaft to rotate a predetermined angle.

The microcomputer 11 also arithmetically operates, using an ignition timing arithmetically operation map, an ignition timing of the engine relative to the rotational speed detected by the rotational speed detection means 23. The ignition timing is operated as a time required for an ignition timer provided in the microcomputer to measure while the crankshaft rotates from a crank angle position (a reference crank angle position) where the crank angle sensor 5 generates a predetermined pulse signal used as a reference signal to a crank angle position (an ignition position) corresponding to the ignition timing. Thus, the ignition timing arithmetical operation means 24A is constituted by processes for operating the ignition timing.

The microcomputer 11 causes the ignition timer to start a measurement of the ignition timing which is already operated, when the crank angle sensor 5 generates the reference crank angle signal, and generates an ignition instruction signal Si when the ignition timer completes the measurement of the ignition timing. Thus, the ignition instruction generation means 24B is constituted by the processes for generating the ignition instruction signal, and the normal state ignition control means 24 for controlling the ignition timing at the normal operation state of the engine at which the detonation does not occur is constituted by the ignition timing arithmetical operation means 24A and the ignition instruction generation means 24B.

The microcomputer 11 constitutes: intake air amount estimation means 25A for estimating an intake air amount of the engine from the rotational speed detected by the rotational speed detection means and from the throttle opening degree detected by the throttle sensor 4; injection time arithmetical operation means 25B which operates a basic injection time necessary for obtaining the predetermined air-fuel ratio relative to the estimated intake air amount, and operates an actual fuel injection time by multiplying the basic injection time by each correction coefficient obtained relative to various control condition such as an atmospheric pressure detected by a atmospheric pressure sensor not shown, an intake air temperature and a cooling water temperature of the engine detected by a temperature sensor not shown; and injection instruction generation means 25C for generating the injection instruction signal Sj so as to inject the fuel from the injector during the injection time which is arithmetically operated by the injection time arithmetical operation means 25B. The injection instruction generation means 25C sets a time that is a sum of the injection time arithmetically operated by the injection time arithmetically operation means 25B and an invalid injection time as an injector driving time to the injection timer, and makes the injection timer start a measurement of the injector driving time when the reference crank angle signal is generated. The injection instruction generation means 25C also makes the injection instruction signal Si be generated to supply a driving voltage to the injector, and extinguishes the injection instruction signal Sj when the injection timer completes the measurement of the driving time. The intake air amount estimation means 25A, the injection time arithmetical operation means 25B and the injection instruction generation means 25C described above constitute the normal state fuel injection control means 25.

The microcomputer 11 also judges whether the throttle valve opening degree (the throttle opening degree) detected by the throttle sensor 4 is less than the set opening degree and sets the judgment level as a first value when the throttle opening degree is less than the set opening degree and sets the judgment level as a second value which is larger than the first value when the throttle opening degree is equal to or more than the set opening degree. As described above, the throttle opening degree judgment means 26 is constituted by the processes for judging whether the throttle opening degree detected by the throttle sensor 4 is less than the set opening degree, and the judgment level setting means 27 is constituted by the processes for setting the judgment level so as to set the judgment level as the first value when the throttle opening degree is less than the set opening degree and set the judgment level as the second value which is larger than the first value when the throttle opening degree is equal to or more than the set opening degree.

Further, the microcomputer 11 compares a level of the detonation detection signal obtained from the detonation detection signal 16 with the judgment level set by the judgment level setting means 27 and judges that the detonation necessary to be inhibited is generated when the level of the detonation detection signal is larger than the judgment level. The microcomputer 11 judges whether the current air-fuel ratio is reached to the limit on the rich-side when the detonation necessary to be inhibited is detected. This judgment is performed using, for example, the intake air amount estimated by the intake air amount estimation means 15A and the injection time arithmetically operated by the injection time arithmetical operation means. The judging means 28 is constituted by the processes for comparing the level of the detonation detection signal to the judgment level set by the judgment level setting means 27, and the enrich limit detection means 29 is constituted by the processes for judging whether the current air-fuel ratio is reached to the limit of the rich-side.

The microcomputer 11 extends the injection time arithmetically operated by the injection time arithmetical operation means 25C by the predetermined time in order that the air-fuel ratio of air-fuel mixture supplied to the engine is shifted to the rich-side to inhibit the detonation, when it is judged by the judging means 28 that the level of the detonation detection signal is equal to or more than the judgment level, and when it is judged by the enrich limit detection means 29 that the air-fuel ratio does not reached to the limit on the rich-side. Thus, the enrich control means 30 is constituted by the processes for extending the injection time.

To intermittently stop the ignition operation, the microcomputer 11 stops an output of the ignition instruction signal Si from the ignition instruction generation means 24B at predetermined time intervals or at a predetermined cycle, when it is determined by the judging means 28 that the level of the detonation detection signal is equal to or more than the judgment level, and when it is determined by the enrich limit detection means 29 that the air-fuel ratio is reached to the limit of the rich-side. Thus, the ignition control means for detonation inhibition 31 is constituted by the processes for stopping the output of the ignition instruction signal Si from the ignition instruction generation means 24B at the predetermined time intervals or at the predetermined cycle when it is determined that the air-fuel ratio is reached to the limit on the rich-side in order to intermittently stop the ignition operation.

Figure 7:
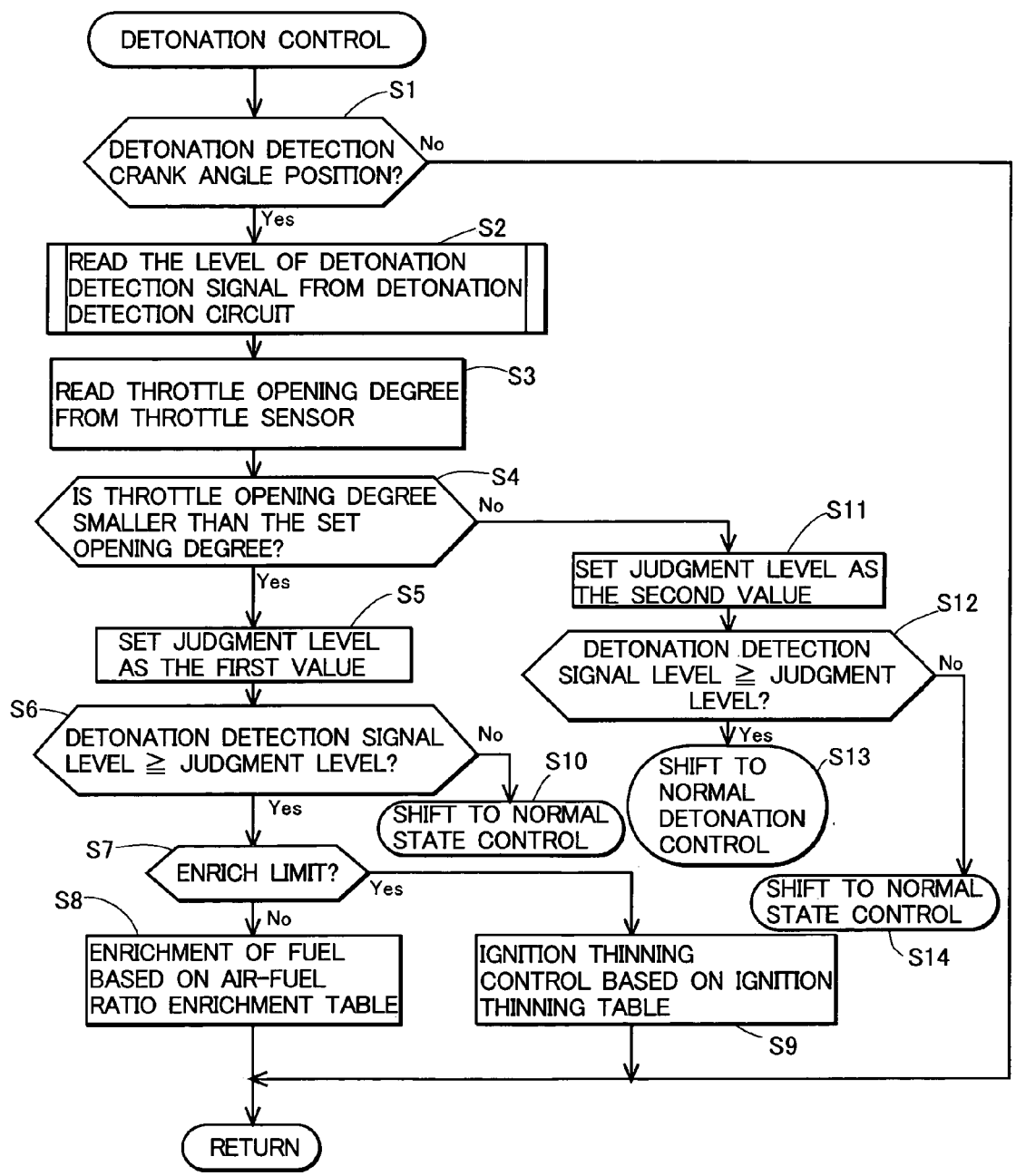
FIG. 7 is a flowchart of an example of an algorithm of a main part of a program executed by a microcomputer for performing a detonation control in the first and second embodiments of the present invention.

In FIG. 7, it is shown a flowchart showing an algorism of detonation control tasks that the microcomputer performs at predetermined time intervals in order to constitute the throttle opening degree judgment means 26, the judgment level setting means 27, the judging means 28, enrich limit detection means 29, enrich control means and the ignition control means for detonation inhibition 31.

According to the algorism shown in FIG. 7, at first, it is determined in Step S1 whether a current crank angle position is a crank angle position where the detonation is detected (a detonation detection crank angle position). As a result, if the position is not the detonation detection crank angle position, no further action is performed to finish this task. In this embodiment, each crank angle position within a crank angle range in which the detonation of the engine tends to occur (for example, each crank angle position between a top dead center crank angle position corresponding to a top dead center of a piston and a position 45° apart in a rotation direction from the top dead center crank angle position) is set as the detonation detection crank angle position.

When it is determined that the current crank angle position is the detonation detection crank angle position in Step S1, the step proceeds to Step S2 to read the level of the detonation detection signal output from the detonation detection circuit 16, and then, the throttle opening degree detected by the throttle sensor in Step S3. Then, in Step S4, it is determined whether the throttle opening degree is less than the set opening degree, and the step proceeds to Step S5 to set the judgment level as the first value when the throttle opening degree is less than the set opening degree. After that, in Step S6, it is determined whether the level of the detonation detection signal is equal to or more than the judgment level. As a result, when the level of the detonation detection signal is equal to or more than the judgment level, it is determined that the air-fuel ratio of mixture is the limit on the rich-side in Step S7. When the air-fuel ratio is not the limit on the rich-side, the step proceeds to Step S8, and the injection time is extended by a constant extension time Δt read out from an air-fuel ratio enrichment table to finish this task. The air-fuel ratio enrichment table is a table which defines a relationship between the level of the detonation detection signal and the extension time Δt so as to set the extension time Δt longer as the level of the detonation detection signal becomes higher, and it is possible to obtain an appropriate value of the extension time Δt for adding to the injection time in order to inhibit the detonation being generated in the engine, by searching this table corresponding to the level of the detonation detection signal.

When it is determined that the air-fuel ratio of mixture is the limit on the rich-side in Step S7, the step proceeds to Step S9 to stop an generation of ignition instruction signal S1 from the ignition instruction generation means 24B during a constant ignition operation stopping time read out from an ignition thinning table, and a control for intermittently stopping the ignition operation of the engine (thinning ignition spark) is performed to finish this task. The ignition thinning table is a table which defines a relationships between the level of the detonation detection signal and the ignition operation stopping time so as to set the ignition operation stopping time longer as the level of the detonation detection signal becomes higher, and it is possible to obtain the ignition operation stopping time appropriate for inhibiting the detonation being generated in the engine, by searching this table corresponding to the level of the detonation detection signal.

In Step S6 in FIG. 7, when it is determined that the level of the detonation detection signal is less than the judgment level (when it is determined that the detonation necessary to be controlled is not generated), the enrich control and the ignition control for inhibiting detonation inhibition are inhibited to shift to the normal state fuel injection control and the ignition timing control.

In Step S4, when it is judged that the throttle opening degree is equal to or more than the set opening degree, the step proceeds to Step S11 to set the judgment value as the second value which is larger than the first value mentioned above, and then the level of the detonation detection signal is compared to the judgment level in Step S12. As a result, when it is determined that the level of the detonation detection signal is equal to or more than the judgment level, the step proceeds to Step S13 to allow the enrich control and the ignition control for detonation inhibition to be performed in order to allow the regular (in a condition that the throttle valve is opened) detonation inhibition control to be performed. When it is determined that the level of the detonation detection signal is not equal to or more than the judgment level, the step proceeds to Step S14 to shift to the normal state ignition control and the fuel injection control in a condition where the detonation unnecessary to be inhibited is not generated.

According to the algorism shown in FIG. 7, Step S4 constitutes the throttle opening degree judgment means 26, Steps S5 and S11 constitute the judgment level setting means 27, Steps S6 and S12 constitute the judging means 28, and Step S7 constitutes the enrich limit detection means 29. Also, Step S8 constitutes the enrich control means 30, and Step S9 constitutes the ignition control means for detonation inhibition 31.

Although the enrich control means 30 is constituted so as to shift the air-fuel ratio to the rich-side by extending the driving time of the injector over the regular driving time in the above embodiment, the constitution of the enrich control means is not limited to the above embodiment.

Figure 2:
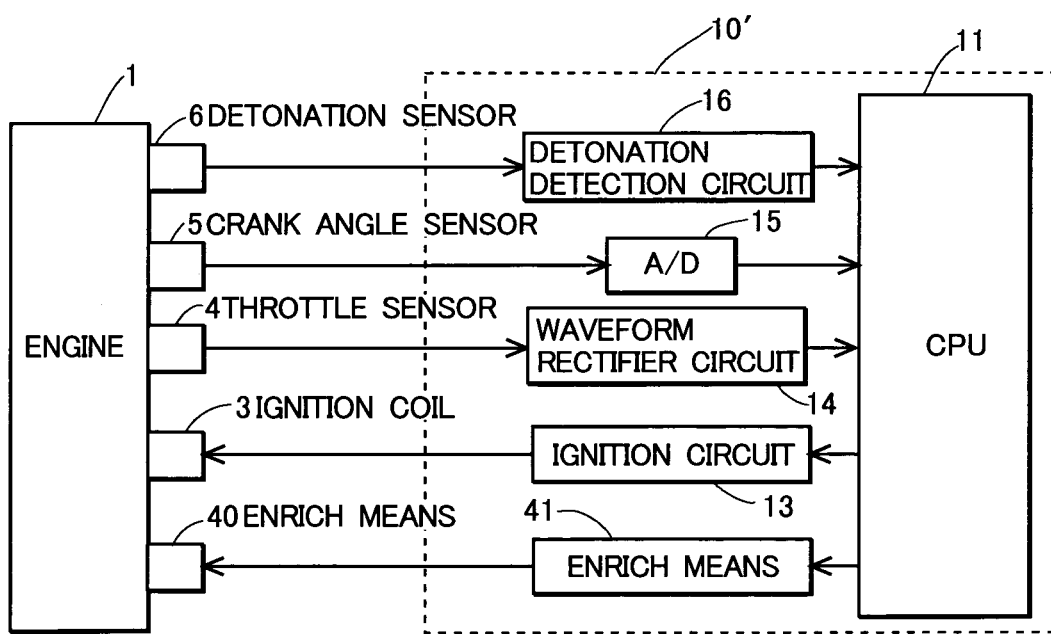
FIG. 2 is a block diagram of a construction of hardware according to a second embodiment of the present invention.

Thus, as shown in FIG. 2, means for adjusting the fuel supply amount of the fuel supply system which supplies fuel to the engine may be used as enrich means 40, and the enrich means may be comprised so as to be driven through a drive circuit 41 with an instruction from the microcomputer, to increase the fuel supply amount by driving the enrich means 40 when the air-fuel ratio is to be shifted to the rich-side.

Figure 4:
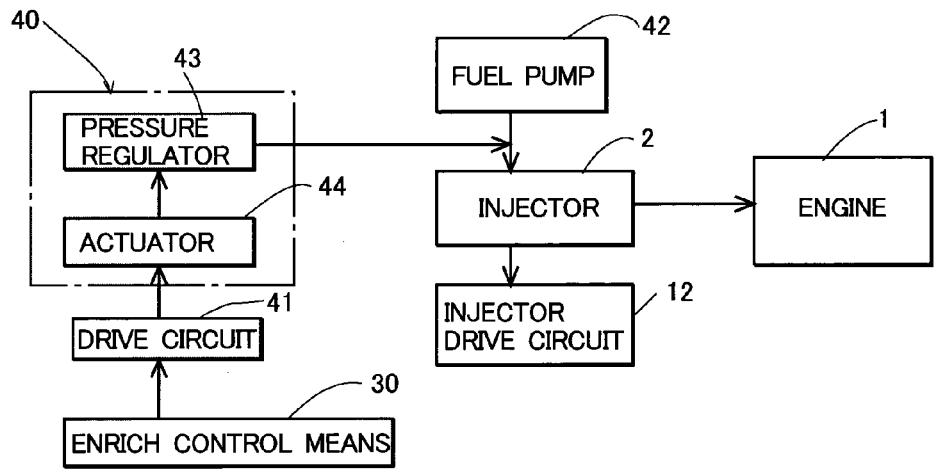
FIG. 4 is a block diagram of a constructional example of a fuel supply system and enrich control means used in the first embodiment of the invention.

For example, as shown in FIG. 4, if the fuel supply system comprises the injector 2 for injecting fuel to be supplied to the engine 1 while the injector is driven, a fuel pump 42 for supplying fuel to the injector 2 and a pressure regulator 43 for regulating a pressure of the fuel supplied from the fuel pump 42 to the injector 2, the pressure regulator 43 is set to change its regulating pressure by driving an actuator 44 by the drive circuit in order to control the regulating pressure of the pressure regulator 43. Thus, the enrich control means 30 can be constituted so that a pressure of fuel to be supplied from the fuel pump to the injector is increased, to shift the air-fuel ratio to the rich-side.

Figure 5:
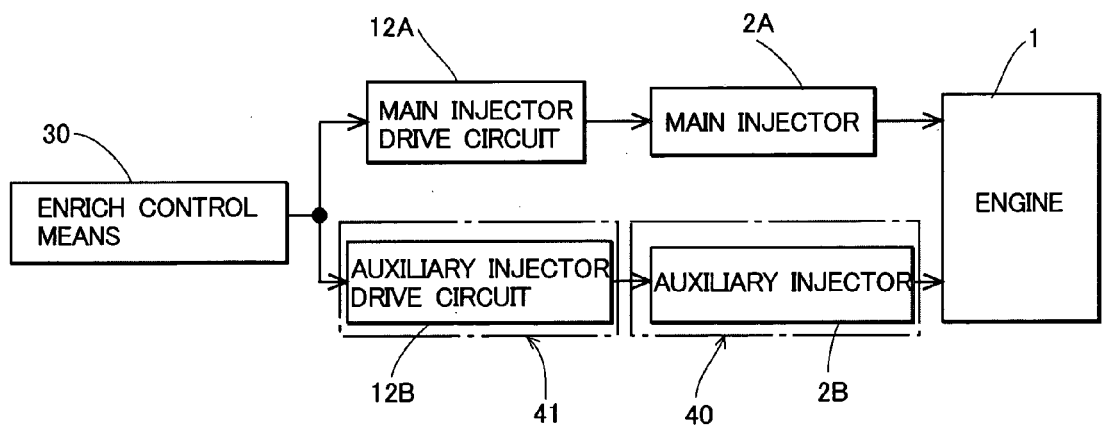
FIG. 5 is a block diagram of another constructional example of a fuel supply system and enrich control means used in the first embodiment of the invention.

Also, as shown in FIG. 5, the enrich control means 30 may be constituted so as to shift the air-fuel ratio to the rich-side by comprising: a main injector 2A and an auxiliary injector 2B for injecting fuel to be supplied to the engine while the injectors are driven; a main injector drive circuit 12A and an auxiliary injector drive circuit 12B for driving each of the main injector 2A and the auxiliary injector 2B; and a fuel pump (not shown) for supplying fuel to the both injectors, by constructing the fuel supply system using a fuel injection system which supplied fuel to the engine 1 by driving the main injector 2A at the normal state, and by injecting fuel from both of the main injector 2A and the auxiliary injector 2B.

Figure 6:
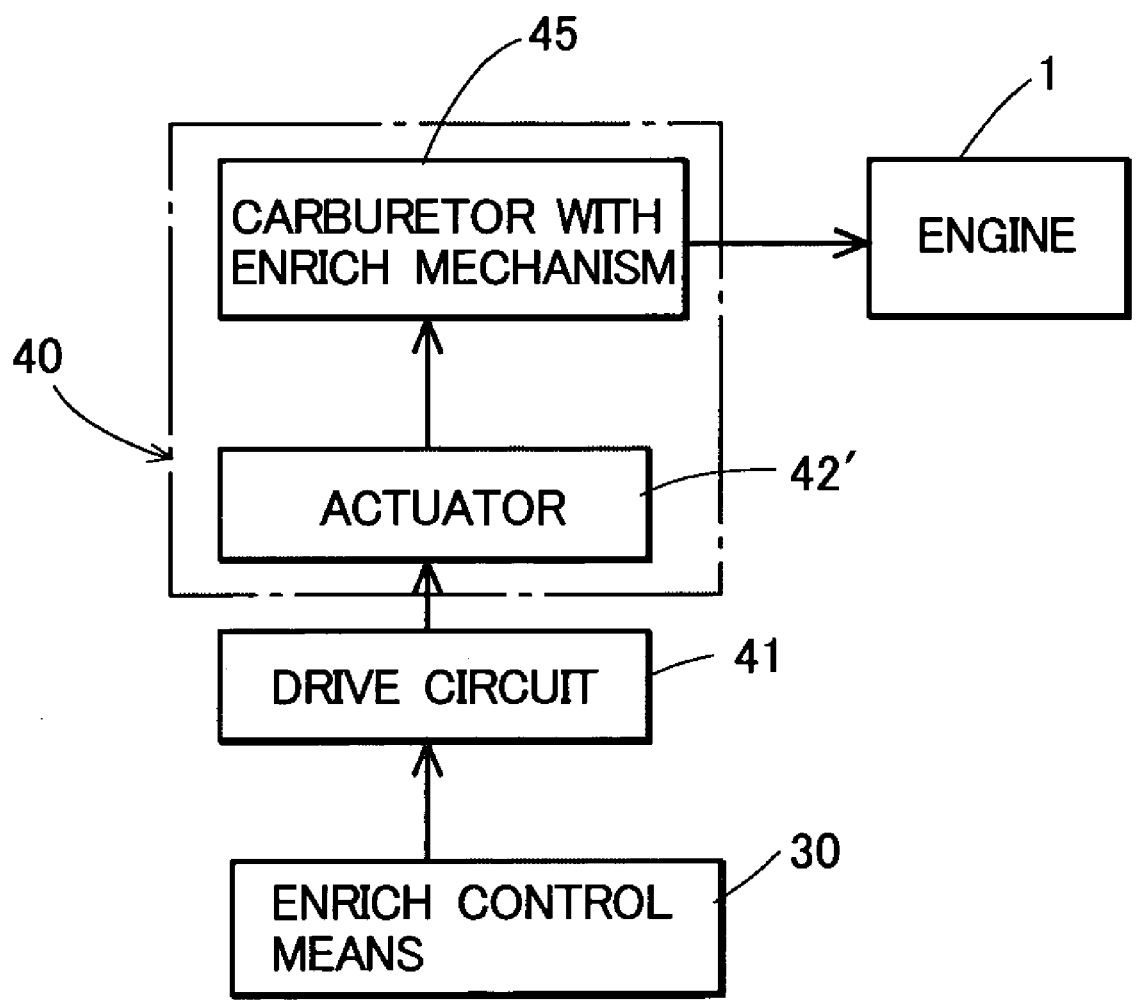
FIG. 6 is a block diagram of another constructional example of a fuel supply system and enrich control means used in the second embodiment of the invention.

Further, as shown in FIG. 6, the fuel supply system 22 can be constituted by a carburetor 45 having enrich mechanism which increases a fuel supply amount. In this case, the enrich mechanism and an actuator 42' which operates the enrich mechanism are used as enrich means, and the enrich control means 30 may be constituted so as to perform a control for increasing the fuel supply amount by driving the actuator 42' through the drive circuit 41 to operate the enrich mechanism.

Although a number of cylinder of the engine is not mentioned in the above description, the present invention can be applied to the case regard less of the number of the cylinder of the engine.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. An engine control system for controlling an engine in which a fuel is supplied from a fuel supply system and which is ignited by an ignition system, comprising:
    a throttle sensor which detects an opening degree of a throttle valve of said engine;
    detonation detection means which outputs a detonation detection signal which level varies according to strength of detonation when detonation occurs in said engine;
    judgment level setting means which gives a judgment level being compared to the level of said detonation detection signal in order to judge whether the detonation which is necessary to be inhibited occurs in said engine;
    enrich control means which controls said fuel supply system so that an air-fuel ratio of air-fuel mixture being supplied to said engine is changed to a rich-side in order to control the detonation when the level of said detonation detection signal is equal to or more than the judgment level; and
    detonation control ignition control means which controls said ignition system so as to intermittently stop an ignition operation of said engine for controlling the detonation when said detonation detection signal is equal to or more than the judgment level even if the air-fuel ratio is enriched to the limit by said enrich control means,
    wherein said judgment level setting means is comprised so that the judgment level is set as a first value when the opening degree of the throttle valve detected by said throttle sensor is less than a set opening degree and that the judgment level is set as a second value which is larger than said first value when the opening degree of the throttle value detected by said throttle sensor is equal to or more than the set opening degree.

2. The engine control system as set forth in claim 1, wherein said fuel supply system is constituted by a fuel injection system comprising an injector which injects a fuel to be supplied to said engine while the injector is driven and a fuel pump which supplies the fuel to said injector, and
    wherein said enrich control means is constituted so as to vary said air-fuel ratio toward the rich-side by extending a driving time of the injector over a normal driving time of the injector.

3. The engine control system as set forth in claim 1, wherein said fuel supply system is constituted by a fuel injection system comprising an injector which injects a fuel to be supplied to said engine while the injector is driven and a fuel pump which supplies the fuel to said injector, and
    wherein said enrich control means is constituted so as to vary said air-fuel ratio toward the rich-side by increasing a pressure of fuel to be supplied to said injector from said fuel pump.

4. The engine control system as set forth in claim 1, wherein said fuel supply system comprises: a main injector and an auxiliary injector which inject the fuel to be supplied to said engine; and a fuel pump which supplies the fuel to both injectors, and is constituted so as to supply the fuel to said engine by driving said main injector at a normal state, and
    wherein said enrich control means is constituted so as to vary said air-fuel ratio to the rich-side by injecting the fuel from both of the main injector and the auxiliary injector.

5. The engine control system as set forth in claim 1, wherein said fuel supply system is constituted by a carburetor comprising an enrich mechanism which increases a fuel supply amount, and
    wherein said enrich control means is constituted so as to vary the air-fuel ratio to the rich-side by controlling the enrich mechanism of said carburetor.

* * * * *